(12) United States Patent
Krishnan et al.

(10) Patent No.: US 12,179,716 B2
(45) Date of Patent: Dec. 31, 2024

(54) VEHICLE WASH ASSEMBLY

(71) Applicant: Ford Global Technologies, LLC, Dearborn, MI (US)

(72) Inventors: Venkatesh Krishnan, Canton, MI (US); Fabio Ferreira, Lauro de Freitas (BR); Segundo Baldovino, Novi, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 17/522,219

(22) Filed: Nov. 9, 2021

(65) Prior Publication Data
US 2023/0146146 A1 May 11, 2023

(51) Int. Cl.
*B60S 1/48* (2006.01)
*B60S 1/50* (2006.01)
*B60S 1/60* (2006.01)

(52) U.S. Cl.
CPC ............... *B60S 1/481* (2013.01); *B60S 1/50* (2013.01); *B60S 1/60* (2013.01)

(58) Field of Classification Search
None
See application file for complete search history.

(56) References Cited

U.S. PATENT DOCUMENTS

| 5,946,763 | A | 9/1999 | Egner-Walter et al. |
| 8,684,686 | B2 | 4/2014 | Gopalan et al. |
| 2018/0141522 | A1 | 5/2018 | Satarino et al. |
| 2018/0251099 | A1 | 9/2018 | Satarino et al. |
| 2018/0370496 | A1* | 12/2018 | Sykula ................ B60S 1/56 |
| 2019/0161035 | A1* | 5/2019 | Salter ................. B60S 1/50 |
| 2019/0237720 | A1* | 8/2019 | Lucchesi ............ H01M 50/20 |
| 2019/0359178 | A1* | 11/2019 | Hornby .............. B60S 1/481 |
| 2020/0001832 | A1* | 1/2020 | Deane ................ B08B 3/02 |
| 2020/0022868 | A1* | 1/2020 | Horn .................. H02K 11/33 |
| 2020/0139941 | A1* | 5/2020 | Jansson .............. B60S 1/50 |
| 2020/0317160 | A1* | 10/2020 | Albrecht ............ F16K 27/003 |
| 2021/0197769 | A1* | 7/2021 | Shirakura ........... B60S 1/56 |
| 2023/0059307 | A1* | 2/2023 | Park .................. B60S 1/481 |

FOREIGN PATENT DOCUMENTS

| EP | 1667800 B1 | 11/2010 | |
| FR | 3089262 A1 * | 6/2020 | ........... F04D 13/14 |
| KR | 100656940 B1 * | 12/2006 | |
| WO | 0139949 A2 | 6/2001 | |
| WO | WO-2020210450 A1 * | 10/2020 | ........... B60S 1/481 |

* cited by examiner

*Primary Examiner* — Spencer E. Bell
*Assistant Examiner* — Omair Chaudhri
(74) *Attorney, Agent, or Firm* — Vichit Chea; Price Heneveld LLP

(57) ABSTRACT

A vehicle wash system includes a manifold having pump compartments separated by dividers. The manifold is constructed of an electrically conductive material to shield electromagnetic fields. A pump is disposed within each compartment and configured to generate the electromagnetic fields when activated. A power connector is coupled to the manifold. The power connector is configured to power each pump and is a common ground for the manifold. An upper level sensor is proximate to the manifold. A lower level sensor is proximate to the manifold. The upper level sensor and the lower level sensor are configured to sense fluid level in a washer bottle.

20 Claims, 5 Drawing Sheets

VEHICLE WASH ASSEMBLY

FIELD OF THE DISCLOSURE

The present disclosure generally relates to a wash assembly. More specifically, the present disclosure relates to a wash assembly for a vehicle.

BACKGROUND OF THE DISCLOSURE

Vehicles may have systems for cleaning various components, such as a windshield. These systems may include a housing for holding fluid and pumping components for directing the fluid to various locations.

SUMMARY OF THE DISCLOSURE

According to at least one aspect of the present disclosure, a vehicle includes a body. Sensors are coupled to the body and define fields of view that extend in multiple directions from the body. A wash assembly is coupled to the body. The wash assembly is configured to direct fluid to the sensors for cleaning. The wash assembly includes a manifold having an interior divided into pump compartments by internal dividers. The manifold is constructed of an electrically conductive material and includes opposing ground attachments coupled to the body. A pump is disposed in each pump compartment.

According to another aspect of the present disclosure, a vehicle wash system includes a manifold having pump compartments separated by dividers. The manifold is constructed of an electrically conductive material to shield electromagnetic fields. A pump is disposed within each compartment and configured to generate the electromagnetic fields when activated. A power connector is coupled to the manifold. The power connector is configured to power each pump and is a common ground for the manifold. An upper level sensor is proximate to the manifold. A lower level sensor is proximate to the manifold. The upper level sensor and the lower level sensor are configured to sense fluid level in a washer bottle.

According to another aspect of the present disclosure, a wash assembly for a vehicle includes a manifold defining an interior. The manifold includes a dividing wall separating the interior into a fluid cavity and a pump cavity, first dividers separating the pump cavity into pump compartments, and second dividers separating the fluid cavity into chambers. Each second divider defines an opening for fluidly coupling the chambers. Each chamber aligns with one of the pump compartments. A pump is disposed within each pump compartment. An impeller is disposed within each chamber. Each impeller extends through the dividing wall to engage one of the pumps, respectively.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description, which follows and will be apparent to those skilled in the art from the description, or recognized by practicing the device as described in the following description, together with the claims and appended drawings.

Figure 1:
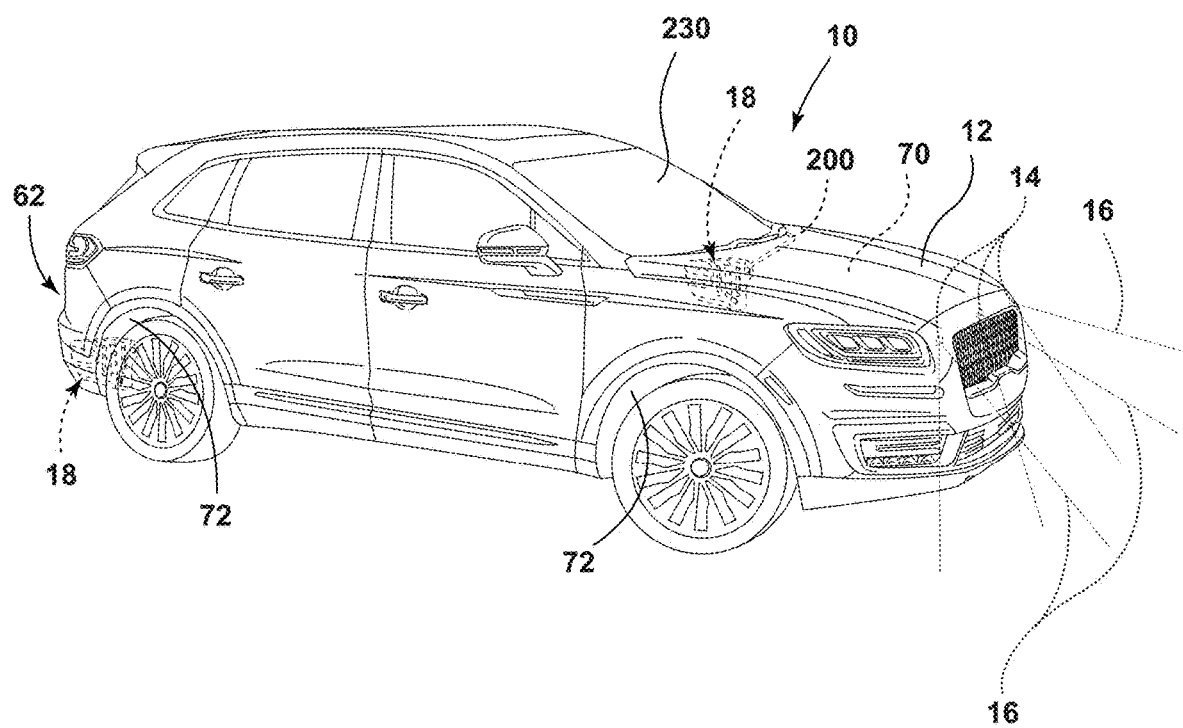
FIG. 1 is a side perspective view of a vehicle with a wash system, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With reference to FIGS. 1-6, reference numeral 10 generally designates a vehicle 10 that has a body 12 and sensors 14 coupled to the body 12. The sensors 14 define fields of view 16 that extend in multiple directions from the body 12. A wash assembly 18 is coupled to the body 12. The wash assembly 18 is configured to direct fluid to the sensors 14 for cleaning. The wash assembly 18 includes a manifold 20 having an interior 22 divided into pump compartments 24 by internal dividers 26. The manifold 20 is constructed of an electrically conductive material and includes opposing ground attachments 28, 30 coupled to the body 12. A pump 32 is disposed in each pump compartment 24.

Figure 2:
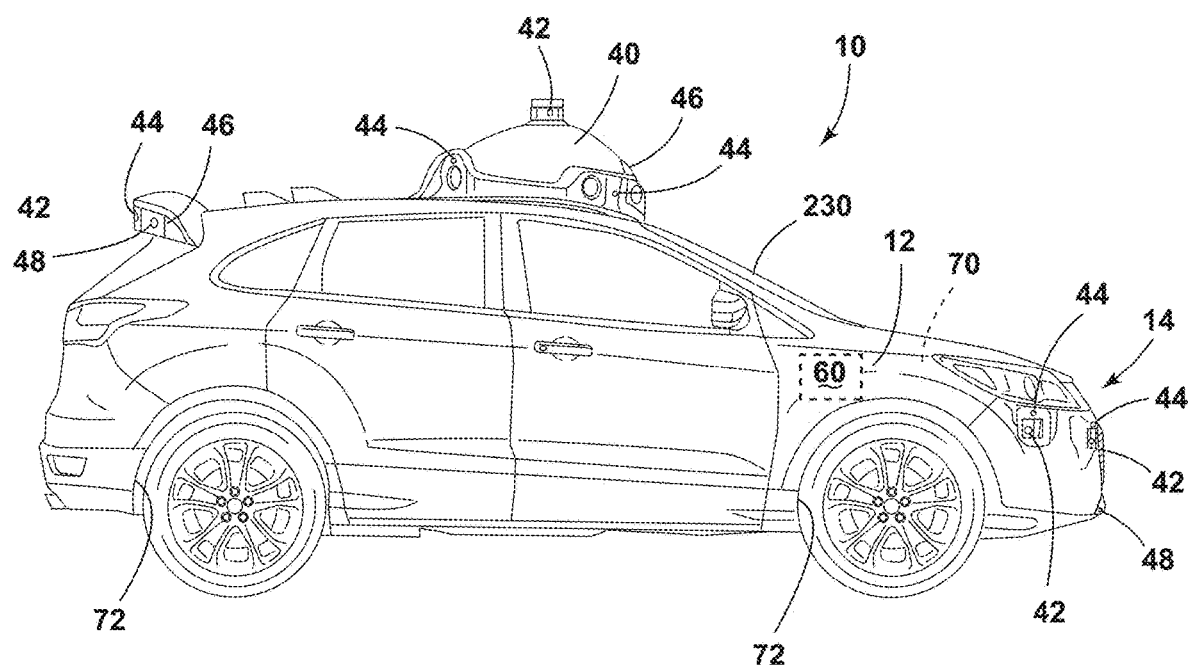
FIG. 2 is a side perspective view of an autonomous vehicle with a wash system, according to the present disclosure.

With reference to FIGS. 1 and 2, the vehicle 10 is illustrated as an autonomous vehicle 10 that includes the sensors 14 disposed in various locations on the body 12. Autonomous vehicles 10 generally utilize the sensors 14 and computing devices to operate the vehicle 10 with various levels of interaction from a human driver. The computing devices each generally include a processor, a memory, and other control circuitry. Instructions or routines are stored within the memories and executable by the processors. The computing devices of the vehicle 10 may operate the vehicle 10 in an autonomous mode, a semiautonomous mode, or a non-autonomous mode (e.g., a manual mode).

The autonomous mode is one in which each of a propulsion, a breaking, and a steering system of the vehicle 10 is controlled by the computing devices. In the semiautonomous mode, the computing devices control one or two of the propulsion, the breaking, and the steering systems of the vehicle 10, with a human operator controlling the other system or systems. In the non-autonomous mode, the human operator controls the propulsion, the breaking, and the steering systems of the vehicle 10. It is contemplated that the vehicle 10 may be a fully autonomous vehicle 10 (e.g., operated without the human operator), a partially autonomous vehicle 10 (e.g., operated with or without the human operator), a manually operated vehicle 10 (e.g., operated with the human operator), or a combination thereof without departing the teachings herein.

Figure 3:
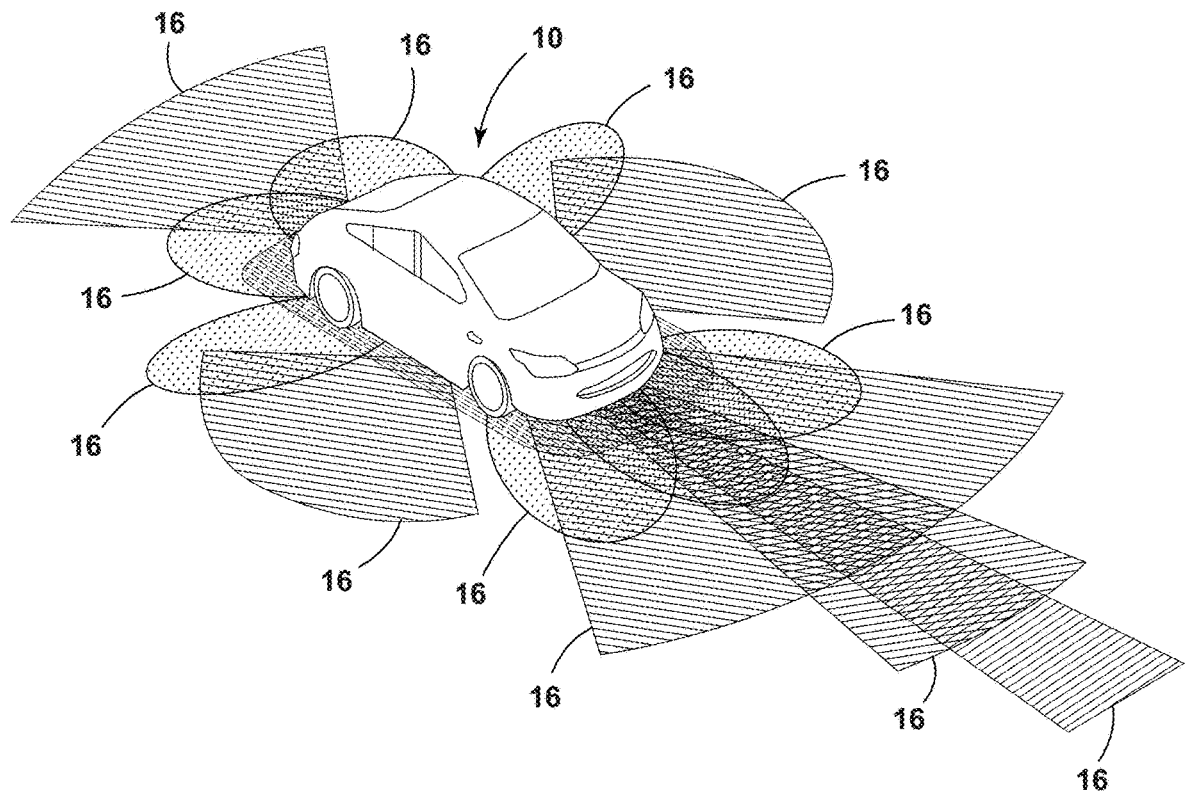
FIG. 3 is a side perspective view of a vehicle having multiple sensors each defining a field of view extending from the vehicle, according to the present disclosure.

Referring still to FIG. 2, as well FIG. 3, the sensors 14 may include a variety of types of sensors 14 for monitoring information around the vehicle 10. The sensors 14 define the fields of view 16 that extend from the vehicle 10. Different sensors 14 generally define differently sized (e.g., width, distance from the vehicle 10, etc.) fields of view 16.

In the illustrated example of FIG. 2, the vehicle 10 includes an outer housing 40 coupled to the body 12, which includes several of the sensors 14. For example, a LIDAR sensor 42 is coupled to the outer housing 40. The outer housing 40 also includes various imagers or cameras 44 with image processing circuitry. Additionally, the outer housing 40 may include audio sensors 46. The vehicle-forward portion of the body 12 also includes multiple sensors 14 including additional LIDAR sensors 42, additional cameras 44 with image processing circuitry, and radar sensors 48. The vehicle-rearward portion of the body 12 also includes additional sensors 14, including LIDAR sensors 42, radar sensors 48, cameras 44 with image processing circuitry, and audio sensors 46.

As best illustrated in FIG. 3, the various sensors 14 each define the respective fields of view 16. The fields of view 16 collectively extend in multiple directions from the vehicle 10, allowing the computing devices to monitor areas surrounding the vehicle 12. For example, fields of view 16 may extend in a vehicle-forward direction, a vehicle-rearward direction, and in vehicle-side directions. The information detected in the fields of view 16 is generally communicated to the computing devices, which process and utilize the information to control the vehicle 10.

With reference still to FIGS. 2 and 3, the sensors 14 may be utilized for adaptive cruise control, breaking, lane departure, parking assist, blind-spot detection, etc. The types of sensors 14 and configuration of the sensors 14 on the body 12 are merely exemplary and not limiting. The vehicle 10 may include additional or alternative configurations of the sensors 14 and additional or alternative types of sensors 14 without departing the teachings herein.

The vehicle 10 may be used for personal and/or commercial purposes, such as for ride-providing services (e.g., chauffeuring), transporting, deliveries, ridesharing services, etc. Further, the vehicle 10 may be a sedan, a truck, a van, a sport utility vehicle, a crossover, or other types of vehicles 10 without departing the teachings herein.

Referring still to FIGS. 2 and 3, each of the sensors 14 is communicatively coupled with the computing devices, which process or analyze information sensed in the fields of view 16 to operate the vehicle 10. Additionally, each of the sensors 14 is communicatively coupled with an electronic control unit (ECU) or controller 60 associated with a wash system 62 of the vehicle 10. The controller 60 includes a processor, a memory, and other control circuitry. Instructions or routines are stored in the memory and executable by the processor. The controller 60 generally includes at least one routine directed to receiving and analyzing information from the sensors 14 to determine whether the sensors 14 are dirty or obstructed. The controller 60 may determine that the sensed information is obscured, altered, or otherwise affected by materials on or near the sensors 14. The controller 60 may then activate the wash system 62 to clean the sensors 14.

Figure 4:
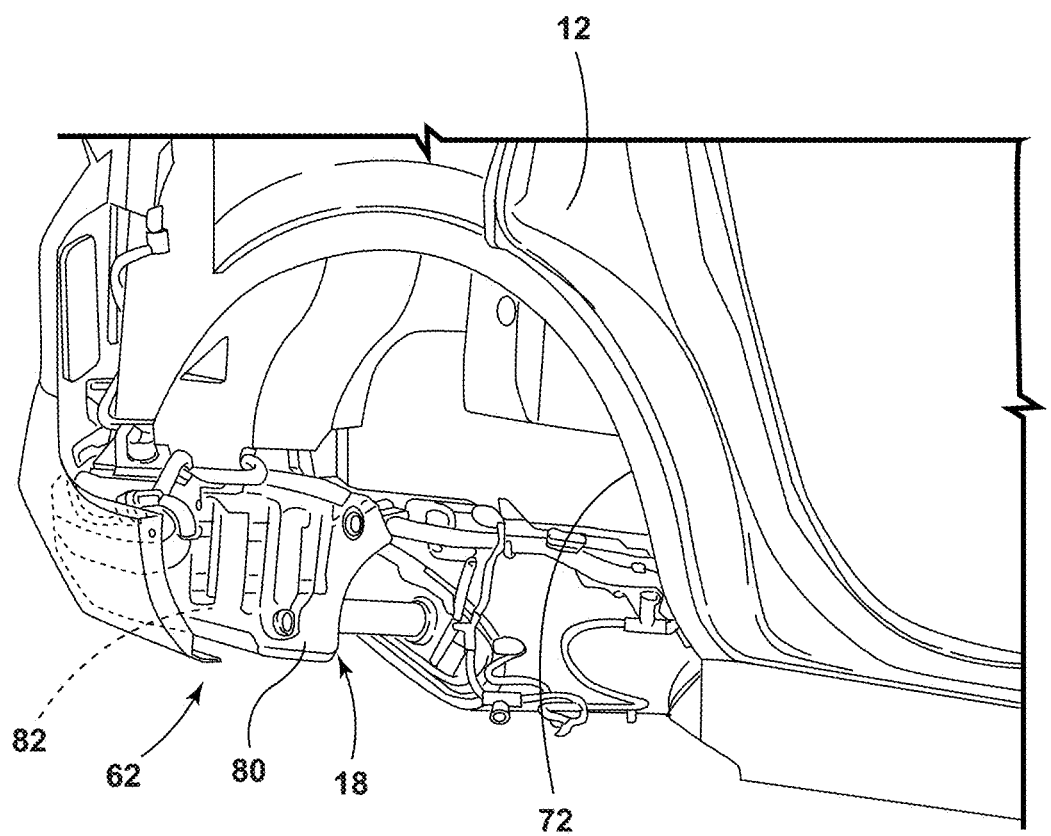
FIG. 4 is a side perspective view of a wash assembly for a wash system coupled to a vehicle body proximate to a wheel well of a vehicle, according to the present disclosure.

Referring again to FIG. 1, as well as to FIG. 4, the wash system 62 of the vehicle 10 includes the wash assembly 18 communicatively coupled with the controller 60. In certain aspects, the wash system 62 includes two wash assemblies 18. Two wash assemblies 18 may be advantageous for housing additional washer fluid on the vehicle 10, as well as for directing the washer fluid to multiple locations along the body 12 of the vehicle 10. The wash assemblies 18 may be controlled selectively and independently by the controller 60.

The wash assemblies 18 may be disposed on opposing ends of the vehicle 10. For example, the vehicle 10 generally includes an engine compartment 70 in a vehicle-forward portion of the body 12. One of the wash assemblies 18 may be disposed within the engine compartment 70. Additionally, the body 12 defines wheel wells 72, and one of the wash assemblies 18 may be coupled to the body 12 proximate to the wheel well 72 in a vehicle-rearward portion of the vehicle 10. The wash assemblies 18 may be substantially similar, or alternatively may have different configurations based on where the wash assembly 18 is located in the vehicle 10. In examples where the wash assemblies 18 have different configurations or shapes, the function of the wash assemblies 18 is substantially similar or identical.

Figure 5:
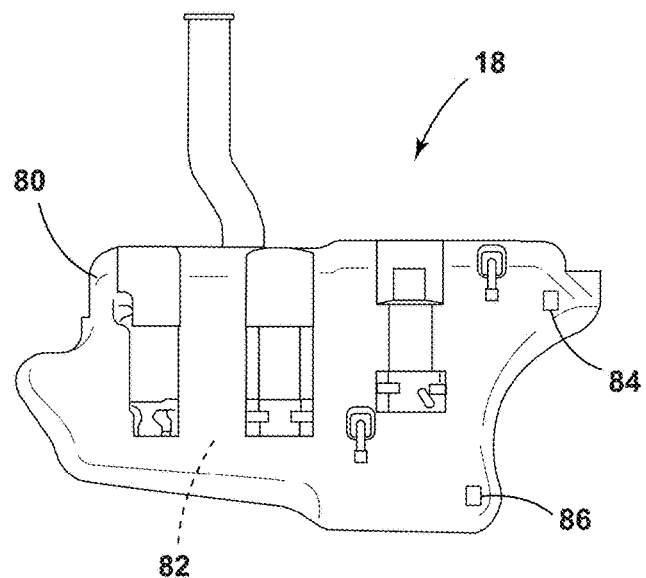
FIG. 5 is a front elevation view of a washer bottle for a wash system, according to the present disclosure.

Referring still to FIG. 4, as well as to FIG. 5, each wash assembly 18 includes a washer bottle 80 that has a reservoir 82 for storing the washer fluid therein. Each wash assembly 18 includes the manifold 20 in fluid communication with the reservoir 82 of the corresponding washer bottle 80. The manifold 20 may be included in the washer bottle 80 or may be separate from the washer bottle 80. Each washer bottle 80 includes an upper level sensor 84 and a lower level sensor 86. Each of the upper and lower level sensors 84 86 is configured to sense a fluid level of the washer fluid within the washer bottle 80. For example, when the upper level sensor 84 senses the fluid level, the washer bottle 80 is at a full or substantially full level. When the lower level sensor 86 no longer senses the washer fluid, the washer bottle 80 is at an empty or near empty level. The upper and lower level sensors 84, 86 are configured to communicate with the controller 60. The controller 60 is configured to monitor the fluid level within the reservoirs 82. When the controller 60 determines the fluid level is low, the controller 60 may generate an alert to be communicated to the human operator, a passenger, or another user. The alert may indicate the fluid level is low and should be refilled.

Figure 6:
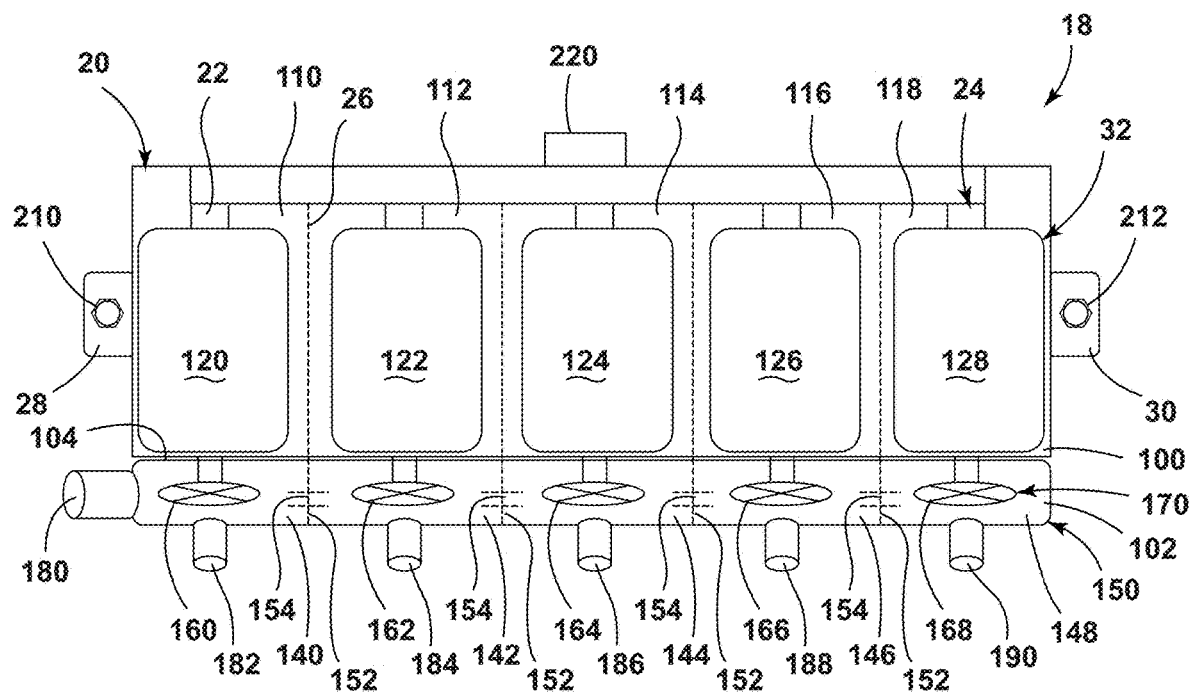
FIG. 6 is a schematic cross-sectional view of an interior of a pump manifold of a wash assembly, according to the present disclosure.

Referring still to FIG. 5, as well as FIG. 6, the manifold 20 defines the interior 22, which is divided into a pump cavity 100 and a fluid cavity 102 by a dividing wall 104. The dividing wall 104 may generally separate the pump cavity 100 from the fluid cavity 102; however, the pump cavity 100 and the fluid cavity 102 are generally in fluid communication with one another. In such configurations, the dividing wall 104 defines openings allowing this fluid communication. The pump cavity 100 is further separated into the multiple pump compartments 110-118, which are separated by the internal dividers 26 and collectively referred to herein as the pump compartments 24. Each pump 32 may be entirely or substantially separated and isolated from an adjacent pump 32 by the respective internal divider 26. Each pump 32 is, therefore, generally isolated within the manifold 20 by an outer structure of the manifold 20, the dividing wall 104, and the internal dividers 26. In the illustrated configuration of FIG. 6, the manifold 20 includes five pumps 120-128, collectively referred to herein as the pumps 32.

The fluid cavity 102 is further separated into chambers 140-146, collectively referred to herein as chambers 148, which are separated from one another by inner dividers 152. The inner dividers 152 are generally aligned with the internal dividers 26 on opposing sides of the dividing wall 104. In this way, the pump compartments 24 are generally aligned with the chambers 148. The inner dividers 152 substantially separate each chamber 148 from the adjacent chambers 148. However, each inner divider 152 may define an opening or channel 154, allowing the chambers 148 to be in fluid communication with one another.

Each wash assembly 18 includes the pumps 32 disposed within the manifold 20. In the illustrated configuration of FIG. 6, the manifold 20 houses the five pumps 120-128 arranged in a linear configuration within the manifold 20 but may have other configurations without departing from the teachings herein. The manifold 20 includes a same number of impellers 160-168 as pumps 32. The impellers 160-168, collectively referred to herein as impellers 170, are arranged in the chambers 140-146, respectively. Each chamber 148 houses one impeller 170, and each impeller 170 is associated with a single pump 32. In various aspects, the impellers 170 are configured to extend through the dividing wall 104 to engage the respective pumps 32.

Referring still to FIG. 6, the impellers 170 and the pumps 32 are each in communication with controller 60 and may be selectively and independently activated to direct the washer fluid to the select location on the vehicle 10. The manifold 20 defines a single inlet 180 for receiving the washer fluid from the washer bottle 80. The activated impeller 170 or impellers 170 may assist in drawing the washer fluid into the fluid cavity 102 and into the chambers 148 with the active impellers 170. The washer fluid may flow through the inlet 180, through some of all of the chambers 148, and through the channels 154 in the inner dividers 152 to reach the select chamber 150 with the activated impeller 170. The activated impeller 170 may drive, guide, or push the washer fluid to the corresponding pump 32 in the adjacent pump compartment 24. The activated pump 32 then directs the washer fluid through a corresponding outlet 182 to a selected location within the vehicle 10.

Each pump 32 is associated with a respective outlet 182. In this way, the wash assembly 18 includes the single inlet 180, and five outlets 184-192, each of which is associated with a single pump 32. The outlets 184-192, collectively referred to herein as the outlets 182, are in fluid communication with tubing that extends to the select location (e.g., the sensors 14, a windshield fluid system 200, etc.) on the vehicle 10 for cleaning.

Each of the pumps 32 and the impellers 170 may generate noise when activated. The noise generated by the wash assembly 18, particularly the wash assembly 18 located proximate to the rear wheel well 72 (FIG. 1), may adversely affect the experience of the passengers within the vehicle 10. The configuration and construction of the manifold 20 may reduce or minimize the noise that is generated by the wash assembly 18 by substantially containing the noise within the manifold 20.

Additionally, at least the pumps 32 may generate electromagnetic fields (EMF) when activated. The EMF may adversely affect the function of the upper and lower level sensors 84, 86. If the upper and lower level sensors 84, 86 are affected by the EMF, the upper and lower level sensors 84, 86 may become ineffective or have reduced accuracy in sensing and communicating the fluid level within the washer bottle 80. With less or inaccurate sensing of the fluid washer level, the wash system 62 may not indicate to the user when the washer fluid is at the empty or near empty level. Further, if the washer fluid reaches the empty level, the sensors 14 (FIG. 2) may not be cleaned. The configuration and construction of the manifold 20 may reduce, minimize, or prevent that EMF from affecting or interfering with the upper and lower level sensors 84, 86 by shielding and isolating the pumps 32.

Referring still to FIG. 6, the materials of the manifold 20 also assist with shielding the EMF and noise. In various aspects, the manifold 20 and each component thereof (e.g. the internal dividers 26, the inner dividers 152, and the dividing wall 104) are constructed of the electrically conductive material. The electrically conductive material may be, for example, conductive plastic. The manifold 20 constructed of the electrically conductive materials may be more efficient as additional shielding components or materials may not be utilized in the wash assembly 18.

In various examples, the manifold 20 is constructed of treated conductive nano-materials. In certain aspects, the treated conductive nano-materials are carbon nanostructures. The carbon nanostructures may be produced through a chemical vapor deposition process that produces flakes of carbon rich with cross-linked carbon nanotubes that if processed with high shear processing, branch out and spread into the three dimensional shapes and take up a larger volume of space. The carbon nano-structure flakes are approximately 50 μm in size. Through a first dispersion process the carbon nanostructure flakes generally break into smaller fragments under low shear in a matrix, and in a second dispersion process, high shear leads to long and branched carbon nanotubes. The carbon nanostructures are electrically conductive material and at least partially shield the EMF.

As the manifold 20 is constructed of electrically conductive material, the manifold 20 is self-grounded to the body 12 of the vehicle 10 with ground bolts 210, 212. As best illustrated in FIG. 6, the manifold 20 includes the ground attachments 28, 30 on opposing sides of the manifold 20. The ground attachments 28, 30 are generally configured as tabs or flanges that extend outward in opposing directions and are constructed of the electrically conductive material. In the illustrated configuration of FIG. 6, the first ground attachment 28 extends proximate to the first pump compartment 110 and the inlet 180, while the opposing ground attachment 30 extends outwardly from proximate to the fifth pump compartment 118.

A power connector 220 such as, for example, a six-way connector, is coupled to the manifold 20. Generally, as illustrated in FIG. 6, the power connector 220 is coupled to a central location between the two ground attachments 28, 30. The power connector 220 is operably coupled to each pump 32 to provide power to each pump 32. Additionally, the power connector 220 also provides a common ground or common ground point for the electrically conductive manifold 20. The manifold 20 is constructed of the electrically conductive material to shield the EMF.

With reference again to FIGS. 1-6, the manifold 20 is in fluid communication with the washer bottle 80. The manifold 20 includes the inlet 180, which may be approximately 12 mm in diameter, which is in fluid communication with the reservoir 82 of the washer bottle 80. When at least one of the pumps 32 is activated, the washer fluid is directed from the washer bottle 80, through the inlet 180, and into the fluid cavity 102. The fluid cavity 102 holds and contains the washer fluid to feed into the pumps 32 when at least one of the pumps 32 is activated. The pumps 32 and the impellers 170 are each in communication with the controller 60. The controller 60 may selectively and independently operate each impeller 170 and each pump 32.

In various examples, the controller 60 may activate selected impellers 170 and pumps 32 based on the end location for the washer fluid or based on the cleaning to be performed. For example, when one of the sensors 14 is determined to be obstructed or dirty, which may be determined by the controller 60 analyzing the sensed information, the controller 60 may activate the select impeller 170 and pump 32 to direct the washer fluid to the obscured sensor 14. Additionally, when a windshield 230 of the vehicle 10 is to be cleaned, the controller 60 may activate the select impeller 170 and pump 32 to direct the washer fluid to the windshield fluid system 200. Once activated, the impellers 170 may assist in drawing the fluid into the fluid cavity 102 and pushing the fluid to the corresponding pump 32. The pumps 32 are configured to direct the washer fluid through the corresponding outlet 182 and to the sensors 14 or windshield fluid system 200.

The manifold 20 houses the pumps 32 such that each pump 32 is separated and substantially isolated with shield portions of the manifold 20, which substantially contain the EMF from escaping the manifold 20. The manifold 20 is constructed of the electrically conductive material, which assists in shielding the EMF and is grounded to the body 12 of the vehicle 10 with ground bolts 210, 212 on both sides of the manifold 20 at the ground attachments 28, 30. The power connector 220 provides the common ground for the manifold 20, as well as power to each of the pumps 32.

Use of the present device may provide for a variety of advantages. The manifold 20 has the single inlet 180 in fluid communication with the interior 22, which may decrease leak potential when directing the washer fluid into the manifold 20. Further, the manifold 20 has the single power connector 220, which may provide poka-yoke connections. Additionally, the manifold 20 is constructed of the electrically conductive material to protect against and shield the EMF. In this way, no additional shields may be added to the manifold 20 or the wash assembly 18. Further, the manifold 20 is grounded to the vehicle 10 with the ground bolts 210, 212 coupled to the body 12 of the vehicle 10. Also, the manifold 20 may be located anywhere in the vehicle 10, including the wheel well 72 and the engine compartment 70. In this way, the manifold 20 allows for increased flexibility in the location of the wash assembly 18 due to the reduced noise level from the manifold 20. Additionally, the manifold 20 may have an increased size, as the pumps 32 are included in the manifold 20 rather than the washer bottle 80 components. This configuration may provide increased fluid volume in the wash assembly 18, which is advantageous for autonomous vehicle 10 use with the various sensors 14. Further, use of the manifold 20 may improve the durability of the wash assembly 18 and increase efficiency in the manufacturing process. Additional benefits or advantages may be realized and/or achieved.

According to various examples, a vehicle includes a body. Sensors are coupled to the body and define fields of view that extend in multiple directions from the body. A wash assembly is coupled to the body. The wash assembly is configured to direct fluid to the sensors for cleaning. The wash assembly includes a manifold having an interior divided into pump compartments by internal dividers. The manifold is constructed of an electrically conductive material and includes opposing ground attachments coupled to the body. A pump is disposed in each pump compartment. Examples of the present disclosure may include one or a combination of the following features:

- the manifold is constructed of carbon nanostructures;
- the wash assembly includes a power connector coupled to the manifold and configured to provide power to each of the pumps;
- the ground attachments are coupled to the body via ground bolts;
- the wash assembly further includes a lower level sensor and a upper level sensor;
- the lower level sensor and the upper level sensor are configured to sense a level of fluid within a washer bottle;
- the pumps generate electromagnetic fields when activated;

the manifold is configured to shield the electromagnetic fields to reduce interference of the electromagnetic fields with the lower level sensor and the upper level sensor;

the body defines a wheel well; and/or the manifold is coupled to the body proximate to the wheel well.

According to various examples, a vehicle wash system includes a manifold having pump compartments separated by dividers. The manifold is constructed of an electrically conductive material to shield electromagnetic fields. A pump is disposed within each compartment and configured to generate the electromagnetic fields when activated. A power connector is coupled to the manifold. The power connector is configured to power each pump and is a common ground for the manifold. An upper level sensor is proximate to the manifold. A lower level sensor is proximate to the manifold. The upper level sensor and the lower level sensor are configured to sense fluid level in a washer bottle. Examples of the present disclosure may include one or a combination of the following features:

the manifold defines an outlet associated with each pump;

each outlet directs the fluid to a separate location;

the separate locations include sensors and a windshield fluid system;

the manifold includes ground attachments on opposing sides of the manifold;

the ground attachments are configured to be grounded to a vehicle body with ground bolts;

the manifold is constructed of treated conductive nanomaterials;

the manifold is constructed of carbon nanostructures;

the manifold defines a fluid cavity in fluid communication with an inlet to receive the fluid from the washer bottle;

an impeller is coupled to each pump; and/or each impeller is disposed in the fluid cavity to guide the fluid from the fluid cavity to the corresponding pump.

According to various examples, a wash assembly for a vehicle includes a manifold defining an interior. The manifold includes a dividing wall separating the interior into a fluid cavity and a pump cavity, first dividers separating the pump cavity into pump compartments, and second dividers separating the fluid cavity into chambers. Each second divider defines an opening for fluidly coupling the chambers. Each chamber aligns with one of the pump compartments. A pump is disposed within each pump compartment. An impeller is disposed within each chamber. Each impeller extends through the dividing wall to engage one of the pumps, respectively. Examples of the present disclosure may include one or a combination of the following features:

the manifold is constructed of carbon nanostructures configured to shield at least one of electromagnetic fields and noise generated by at least one of the pumps and the impellers;

the manifold includes ground attachments extending from opposing sides thereof;

a power connector coupled to the manifold;

the power connector is configured to provide power to each pump and a common ground point; and/or the manifold defines an outlet in fluid communication with each pump and a single inlet.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a body;
   sensors coupled to the body and defining fields of view that extend in multiple directions from the body; and
   a wash assembly coupled to the body, wherein the wash assembly is configured to direct fluid to the sensors for cleaning, wherein the wash assembly includes:
      a manifold having an interior divided a pump cavity and a fluid cavity by a dividing wall, wherein the pump cavity is divided into pump compartments by internal dividers, and wherein the fluid cavity is divided into chambers by inner dividers, and further wherein the manifold is constructed of an electrically conductive material and includes opposing ground attachments coupled to the body;
      a pump disposed in each pump compartment; and
      an impeller disposed within each chamber, wherein the chambers are aligned with the pump compartments, and wherein the inner dividers define channels for the chambers housing the impellers to be in fluid communication with one another and allow for the passage of the fluid between adjacent chambers.

2. The vehicle of claim 1, wherein the electrically conductive material of the manifold is carbon nanostructures.

3. The vehicle of claim 1, wherein the wash assembly includes a power connector coupled to the manifold and configured to provide power to each of the pumps.

4. The vehicle of claim 1, wherein the ground attachments are coupled to the body via ground bolts.

5. The vehicle of claim 1, wherein the wash assembly further includes:
   a lower level sensor; and
   a upper level sensor, wherein the lower level sensor and the upper level sensor are configured to sense a level of fluid within a washer bottle.

6. The vehicle of claim 5, wherein the pumps generate electromagnetic fields when activated, and wherein the manifold is configured to shield the electromagnetic fields to reduce interference of the electromagnetic fields with the lower level sensor and the upper level sensor.

7. The vehicle of claim 1, wherein the body defines a wheel well, and the manifold is coupled to the body proximate to the wheel well.

8. A vehicle wash system, comprising:
   a manifold having an outer surface defining an interior, wherein the manifold is constructed of an electrically conductive material to shield electromagnetic fields;
   a dividing wall separating the interior into a pump cavity and a fluid cavity;
   pumps disposed within the fluid cavity and configured to generate the electromagnetic fields when activated;
   dividers extending from the outer surface to the dividing wall to divide the fluid cavity into compartments;
   an impeller disposed within each compartment, wherein the dividers each define an opening for the compartments housing the impellers to be in fluid communication and allow the passage of fluid therebetween;
   a power connector coupled to the manifold, wherein the power connector is configured to power each pump and is a common ground for the manifold;
   an upper level sensor proximate to the manifold; and
   a lower level sensor proximate to the manifold, wherein the upper level sensor and the lower level sensor are configured to sense fluid level in a washer bottle.

9. The vehicle wash system of claim 8, wherein the manifold includes internal dividers to separate the pump cavity into pump compartments, the internal dividers extending between adjacent pumps to isolate the pumps, and wherein the manifold defines an outlet associated with each pump, and wherein each outlet directs the fluid to a separate location.

10. The vehicle wash system of claim 9, wherein the separate locations include sensors and a windshield fluid system.

11. The vehicle wash system of claim 8, wherein the manifold includes ground attachments on opposing sides of the manifold, wherein the ground attachments are configured to be grounded to a vehicle body with ground bolts.

12. The vehicle wash system of claim 8, wherein the manifold is constructed of conductive nano-materials.

13. The vehicle wash system of claim 12, wherein the nano-materials of the manifold are carbon nanostructures.

14. The vehicle wash system of claim 8, wherein the fluid cavity is in fluid communication with an inlet to receive the fluid from the washer bottle.

15. The vehicle wash system of claim 14, wherein each impeller is disposed in the fluid cavity to guide the fluid from the fluid cavity to the corresponding pump.

16. A wash assembly for a vehicle, comprising:
   a manifold having an outer surface defining an interior, wherein the manifold includes:
      a dividing wall extending between first and second sides of the outer surface and separating the interior into a fluid cavity and a pump cavity,
      first dividers extending from a third side of the outer structure to the dividing wall separating the pump cavity to form pump compartments on opposing sides of each of the first dividers; and
      second dividers extending from the dividing wall to a fourth side of the outer structure and aligned with the first dividers, the second dividers separating the fluid cavity into chambers, wherein each second divider defines an opening for fluidly coupling the chambers, and wherein each chamber aligns with one of the pump compartments;
   a pump disposed within each pump compartment; and
   an impeller disposed within each chamber, wherein each impeller extends through the dividing wall to engage one of the pumps, respectively, and wherein washer fluid is configured to flow through the openings to reach the chamber where the impeller is activated.

17. The wash assembly of claim 16, wherein the manifold is constructed of carbon nanostructures configured to shield at least one of electromagnetic fields and noise generated by at least one of the pumps and the impellers.

18. The wash assembly of claim 16, further comprising:
   ground bolts, wherein the manifold includes opposing ground attachments extending from opposing sides of the manifold, and wherein the ground bolts are configured to couple the opposing ground attachments to a body of said vehicle to self-ground the manifold.

19. The wash assembly of claim 18, further comprising:
   a power connector coupled to the manifold, wherein the power connector is disposed between the opposing ground attachments and configured to provide power to each pump and a common ground point.

20. The wash assembly of claim 16, wherein the manifold defines an outlet in fluid communication with each pump and a single inlet.

* * * * *